(12) United States Patent
Benameur et al.

(10) Patent No.: US 9,058,656 B2
(45) Date of Patent: Jun. 16, 2015

(54) IMAGE RESTORATION SYSTEM AND METHOD

(71) Applicants: Said Benameur, Anjou (CA); Frédéric Lavoie, Ste-Martine (CA)

(72) Inventors: Said Benameur, Anjou (CA); Frédéric Lavoie, Ste-Martine (CA)

(73) Assignee: EIFFEL MEDTECH INC., Montréal, Québec (CA)

( * ) Notice: Subject to any disclaimer, the term of this patent is extended or adjusted under 35 U.S.C. 154(b) by 61 days.

(21) Appl. No.: 13/748,550

(22) Filed: Jan. 23, 2013

(65) Prior Publication Data

US 2014/0205166 A1 Jul. 24, 2014

Related U.S. Application Data

(60) Provisional application No. 61/632,340, filed on Jan. 23, 2012.

(30) Foreign Application Priority Data

Jan. 23, 2012 (CA) .................................... 2765244

(51) Int. Cl.
 *G06T 5/00* (2006.01)

(52) U.S. Cl.
 CPC ....... *G06T 5/003* (2013.01); *G06T 2207/10132* (2013.01); *G06T 2207/20021* (2013.01); *G06T 2207/20052* (2013.01)

(58) Field of Classification Search
 None
 See application file for complete search history.

(56) References Cited

U.S. PATENT DOCUMENTS

| | | | | |
|---|---|---|---|---|
| 5,748,491 A | * | 5/1998 | Allison et al. | 702/22 |
| 5,776,063 A | * | 7/1998 | Dittrich et al. | 600/408 |
| 6,443,895 B1 | * | 9/2002 | Adam et al. | 600/443 |
| 7,783,433 B2 | * | 8/2010 | Gordon et al. | 702/39 |
| 8,105,237 B2 | * | 1/2012 | Waters et al. | 600/437 |
| 2002/0049379 A1 | * | 4/2002 | Adam et al. | 600/437 |
| 2007/0047788 A1 | * | 3/2007 | Slablaugh et al. | 382/128 |
| 2007/0083114 A1 | * | 4/2007 | Yang et al. | 600/437 |
| 2007/0299343 A1 | * | 12/2007 | Waters | 600/443 |
| 2008/0289423 A1 | * | 11/2008 | Gordon et al. | 73/602 |
| 2009/0299186 A1 | * | 12/2009 | Waters et al. | 600/449 |

* cited by examiner

*Primary Examiner* — Tsung-Yin Tsai
(74) *Attorney, Agent, or Firm* — Equinox IP; Franz Bonsang, Patent Agent

(57) ABSTRACT

A system and a method for improving the quality of ultrasound images. The system comprises a processor being configured to subdivide the ultrasound image, determine a deconvolution factor for the ultrasound image and apply the deconvolution factor to the subdivided ultrasound image, resulting in a restored image.

18 Claims, 6 Drawing Sheets

IMAGE RESTORATION SYSTEM AND METHOD

CROSS-REFERENCE TO RELATED APPLICATIONS

This application claims the benefits of U.S. provisional patent application No. 61/632,340 and Canadian patent application No. 2,765,244, both filed on Jan. 23, 2012, which are herein incorporated by reference.

TECHNICAL FIELD

The present disclosure relates to an image restoration system and method. More specifically, the present disclosure relates to an image restoration system and method for restoring images obtained from an ultrasound imaging system.

BACKGROUND

Contrary to other medical imaging techniques (e.g., X-rays, magnetic resonance imaging, and computerized tomography), ultrasound imagery is currently considered to be a non-invasive, portable, non-expensive and safe (for the patient and operator) visualization medical tool for investigating biological tissues of a body. However, despite considerable advances in the technology of ultrasound imaging equipment over the last years, the primary limitation of this imaging modality remains its poor image quality (i.e. low signal-to-noise ratio, low resolution and contrast), and also the presence of artifacts due to the speckle noise effect that drastically deteriorates image quality and sometimes makes imperceptible clinically important details within these images (such as contours of anatomical structures).

In order to improve the quality of such ultrasound images, an image deconvolution/restoration procedure could be efficiently applied and, to this end, given a Point Spread Function (PSF) estimate, many deconvolution models exist [1]. The only requirement for such deconvolution algorithms consists, as a prerequisite first stage, of an estimation of the PSF of the underlying ultrasound imaging system. This problem of estimating the PSF and restoring is called a blind deconvolution process and an alternative approach to this above-mentioned estimation and deconvolution (disjoint) procedures consists of the simultaneous (generally iterative) estimation of the undegraded original image and the PSF (or its inverse) [2-5].

Amongst the first blind deconvolution strategy for which estimating the PSF estimation and the restoration process are two disjoint procedures, there is the PSF identification procedure based on frequency domain [6] zeros or the homomorphic filtering method which consists in low-pass filtering (also called liftering) in the complex cepstral domain (the cepstrum being defined by the inverse Fourier transform of the log of the spectrum). This low-pass filtering is commonly achieved either with an ideal low-pass filter [7, 8] or by hard or a soft shrinkage rule in the wavelet domain [9]. It is also worth mentioning the estimation approach by means of local polynomial approximation proposed by Adam and Michailovich [10], which can be viewed as a modification of homomorphic estimation by using wavelet bases instead of the Fourier basis. Nevertheless, ideal low-pass filtering in the cepstral domain or by other wavelet-based filtering procedures have several drawbacks.

First, they are highly supervised to adequately set the cutoff frequency parameter which is crucial and different for each ultrasound image because of the spatial variability of the PSF (due to the presence of different interrogated tissues between the transducer and the anatomical structure to be imaged).

Second, these classical filtering methods are not robust enough to give a good estimate of the PSF spectrum and often tend to produce artifacts in this estimation mainly due to the ringing effect of such ideal low pass filter in the Fourier domain or due to the blocky effect inherent to the wavelet based filtering procedure.

Accordingly, there is a need for an image restoration system and method that addresses the above-described shortcomings.

SUMMARY

The present disclosure provides a system for improving the quality of an imaging system image, comprising:
  an input/output interface configured to receive the imaging system image;
  a processor in communication with the input/output interface, the processor being configured to:
    a) subdivide the imaging system image;
    b) determine a deconvolution factor for the imaging system image;
    c) apply the deconvolution factor to the subdivided image; and
    d) provide a restored image based on the deconvoluted subdivided image.

There is further provided a system for improving the quality of an imaging system image as above wherein step b) includes the sub-steps of:
  i) applying a homomorphic filter to the associated modulation transfer function of the point spread function of the imaging system image;
  ii) applying denoising using a hard thresholding rule;
  iii) applying an iterative expectation-maximisation regression model;
  iv) estimating the point spread function; and
  v) setting the deconvolution factor to the estimated point spread function.

The present disclosure also provides a corresponding method for improving the quality of an imaging system image as well as a processor executable product stored on a data storage medium, configured to cause the processor to perform operations corresponding to the method for improving the quality of an imaging system image.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiment of the present disclosure provides a system and a method for improving the quality of images obtained from an imaging system, such as an ultrasound imaging system, through the application of an image restoration process in order to recover clinically important image details, which are often masked due to resolution limitations.

In common ultrasound imaging systems, the spatial resolution is severely limited due to the effects of both the finite aperture and overall bandwidth of ultrasound transducers and the non-negligible width of the transmitted ultrasound beams. This low spatial resolution remains the major limiting factor in the clinical usefulness of medical ultrasound images.

To this end, an estimation of the Point Spread Function (PSF) of the imaging system is required. The image restoration process is a novel, original, reliable, and fast Maximum Likelihood (ML) approach for recovering the PSF of an ultrasound imaging system. This new PSF estimation method is based on an additional constraint, namely that the PSF to be estimated is of known parametric form. Under this constraint, the parameter values of its associated Modulation Transfer Function (MTF) are then efficiently estimated using a homomorphic filter, a denoising step, and an expectation-maximization (EM) based clustering algorithm. Consequently, this amounts to estimating, in the low-pass-filtered cepstral domain, a mixture of two identical Gaussian distributions whose parameters are automatically estimated, in a Maximum Likelihood sense, by an iterative expectation-maximization (EM) [11] based clustering algorithm. Given this PSF estimate, a deconvolution algorithm can then be efficiently used, in a subsequent stage, in order to improve the spatial resolution of ultrasound images, to obtain an estimate of the true tissue reflectivity function, which is then independent of the properties of the imaging system.

Figure 1:
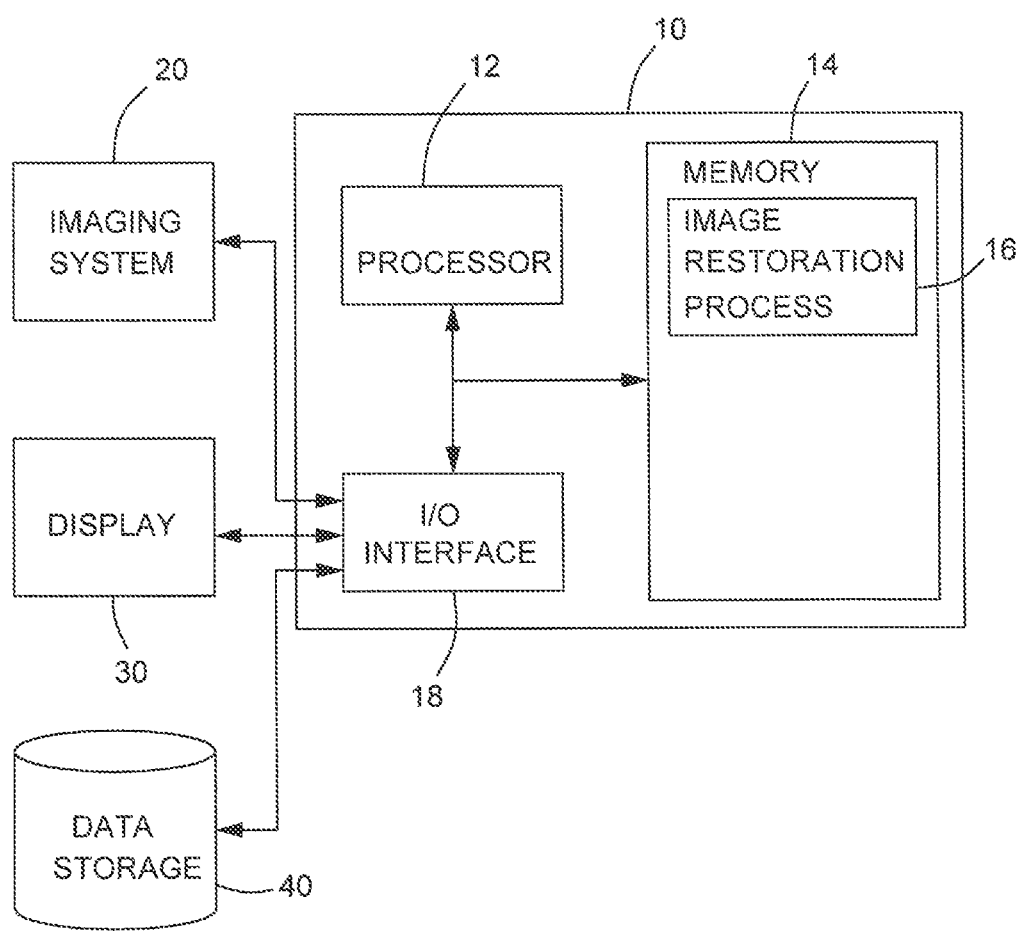
FIG. 1 is a schematic representation of an image restoration system in accordance with an illustrative embodiment of the present disclosure.

Referring to FIG. 1, the image restoration system 10 includes a processor 12 with an associated memory 14 having stored therein processor executable instructions 16 for configuring the processor 12 to perform various processes, namely image restoration process, which process will be further described below. The image restoration system 10 further includes an input/output (I/O) interface 18 for communication with an imaging system 20 and a display 30.

The image restoration system 10 obtains images, for example ultrasound images, from the imaging system 20 and executes the image restoration process 16 on the acquired images. The resulting restored images are then displayed on the display 30 and may be saved to the memory 14, to other data storage devices or medium 40, or provided to a further system via the I/O interface 18.

Figure 2:
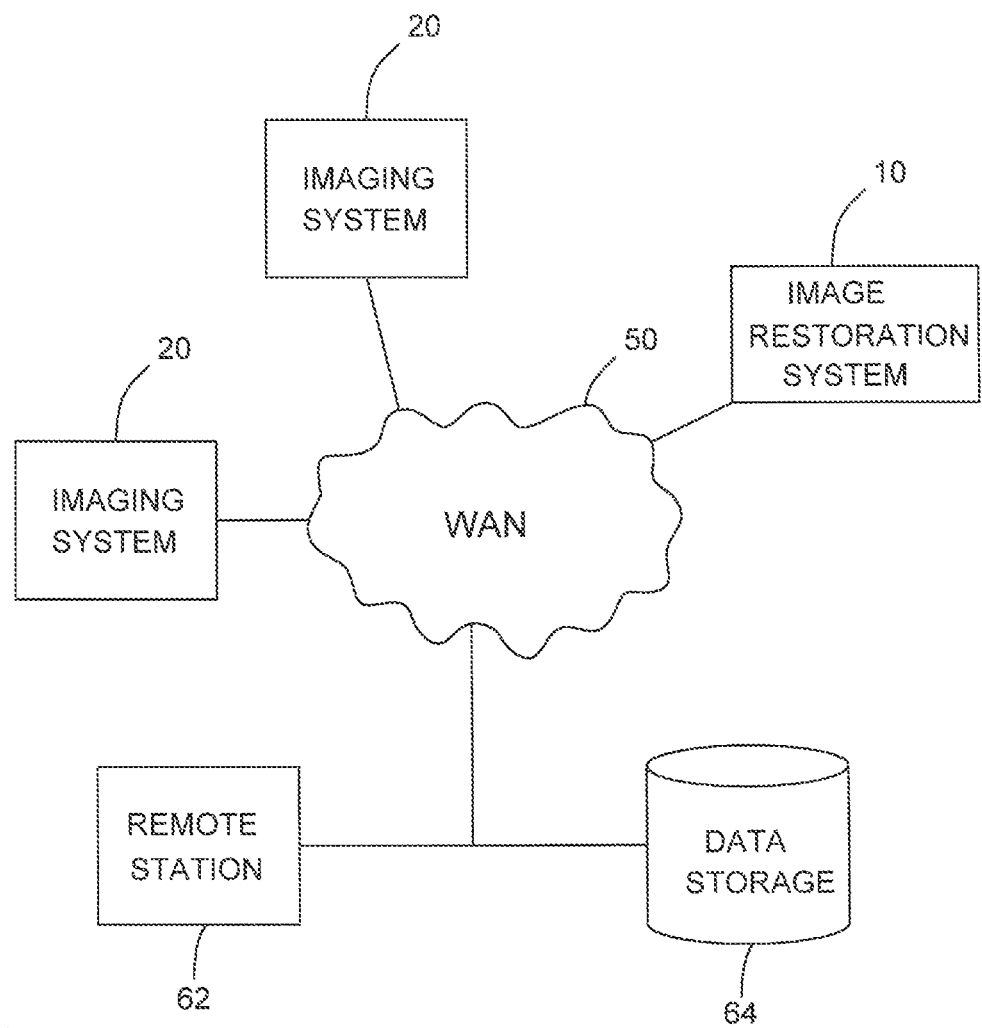
FIG. 2 is a schematic representation of an image restoration system in a remote usage configuration.

Referring to FIG. 2, the image restoration system 10 may be remotely connected to one or more imaging systems 20 and/or remotely operated through a remote station 62 via a wide area network (WAN) such as, for example, Ethernet (broadband, high-speed), wireless WiFi, cable Internet, satellite connection, cellular or satellite network, etc. The remote station 62 may also have associated data storage devices or medium 64 for locally storing restored images provided by the image restoration system 10.

Figure 3:
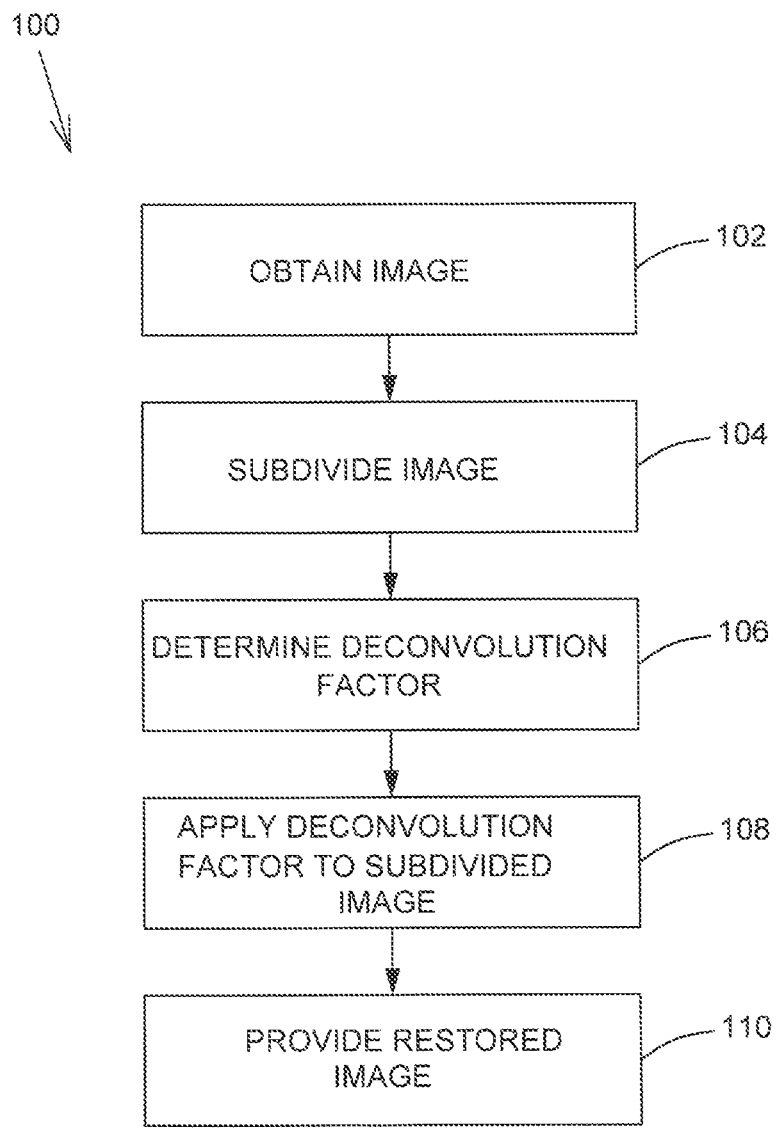
FIG. 3 is a flow diagram of an image restoration process in accordance with an illustrative embodiment of the present disclosure.

Referring now to FIG. 3, there is shown a flow diagram of an illustrative example of the image restoration process 100 executed by the processor 12 (see FIG. 1). Steps of the process 100 are indicated by blocks 102 to 110.

The process 100 starts at block 102 where an image, for example an ultrasound image, is obtained from the imaging system 20 and, at block 104, subdivided.

Then, at block 106, a deconvolution factor is determined for the image and, at block 108, the deconvolution factor is applied to the subdivided image resulting in a restored image.

Finally, at block 110, the restored image is provided, for example through the display 30 and/or stored in a data storage device or medium 40.

The various steps of process 100 will be further detailed below.

PSF Estimation by Homomorphic Transformation

In ultrasound imaging, the PSF happens to exhibit spatial dependency due, among other things, to the non-uniformity of focusing, the dispersive attenuation and the heterogeneity of the different interrogated tissues. Nevertheless, a relatively low spatial variability of these phenomena makes it possible to divide the obtained acoustic image into a predefined number of small enough (possibly overlapping) images, for which the data within each such smaller image can be considered to be quasi-stationary, with a different PSF. It is then assumed that, the entire image can be easily recovered by combining all the local results obtained in this manner.

Assuming space invariance and linearity, the resolution capabilities of an ultrasound imaging system can be expressed in terms of the PSF, $h(x,y)$, i.e. the image of a point reflector, by the following classical linear model:

$$g(x,y) = f(x,y) * h(x,y) + n*(x,y) \qquad \text{Equation 1}$$

where $f(x,y)$ is the spatial reflectance distribution of internal organs of the human body to be imaged, $g(x,y)$ is the degraded ultrasound image of the object $f(x,y)$, $h(x,y)$ is the PSF function of the imaging system 20, which counts for the finite aperture and bandwidth of the transducer, $n(x,y)$ describes the additive quantization and electronic noise and finally * designates the 2D discrete linear convolution operator. Assuming that the noise term $n(x,y)$ is temporarily ignored for the sake of simplicity, Equation 1 is more easily described in frequency domain as a simple product and sum where the capital letters indicate the Fourier transforms of the corresponding spatial functions:

$$G(u,v) = F(u,v)H(u,v) \qquad \text{Equation 2}$$

An homomorphic transformation is simply the complex logarithmic transformation of both side of Equation 2. The real (Re) and the imaginary (Im) parts of the resultant relation are given correspondingly by:

$$\text{Re: } \log|G(u,v)| \cong \log|F(u,v)| + \log|H(u,v)| \qquad \text{Equation 3}$$

$$\text{Im: } \angle G(u,v) \cong \angle F(u,v) + \angle H(u,v) \qquad \text{Equation 4}$$

where the symbols |.| and ∡ denote, respectively, the amplitude and the phase of the complex functions. The basic idea for cepstrum-based methods of estimating the PSF spectrum $H(u,v)$ relies on the fact that $\log|H(u,v)|$ is typically a much smoother function than $\log|F(u,v)|$ and the same holds for the functions $\angle H(u,v)$ and $\angle F(u,v)$. Consequently, in this context, the log-spectrum of the degraded ultrasound image (amplitude and phase) is considered to be a noisy version of the complex log-spectrum of the PSF to be estimated and in this setting, in which log |F(u,v)| and ∡F(u,v) are considered to be sources of noise to be rejected, the problem of recovering log |H(u,v)| and ∡H(u,v) is thus essentially a denoising problem in the cepstral domain.

Denoising Step

In order to ensure both an automatic procedure and also a reliable denoising step allowing a good estimate of the PSF spectrum, H(u,v), without (ringing or blocking) artifacts, a two-stage denoising scheme is proposed; namely a discrete cosine transform (DCT)-based denoising step using a hard thresholding rule followed by a EM-based regression model. In addition, since the PSF model relies on an even function in x and y, the phase spectrum is assumed to be null.

DCT-Based Denoising Step

Algorithmically [12], the DCT-based denoising procedure consists in applying iteratively, until a maximal number of iterations is reached or until convergence is achieved, frequential filtering based on the DCT transform of each 8×8 sub-image extracted from the current version of the image to be denoised (initially, this current image estimate is the noisy image itself). For the filtering operation in the DCT domain, the easily-implemented hard thresholding rule [13] is used, also classically used in wavelet based denoising approaches, where ϵ is a threshold level and ω is one of the coefficients obtained by the DCT transform of the block (of size 8×8 pixels) extracted from the current image to be denoised. In order to reduce blocky artifacts across block boundaries, a standard approach is adopted where this transform is made translation-invariant, by using the DCT of all (circularly) translated version of each channel of the image (herein assumed to be toroidal) [14] (this implies computing a set of 8 horizontal shifts and 8 vertical shifts transformed images) which is then averaged at each step of this iterative denoising procedure. In order to speed up the procedure, an overlap of three pixels is used for the sliding 8×8 window. This iterative denoising procedure, illustrated in Procedure 1, is applied on the noisy version of log H(u,v), i.e., log G(u,v) (amplitude and phase) and allows us to obtain a first rough estimate of log H^(u,v) which will be refined in the next step.

Procedure 1—DCT-Based Denoising

Let
$I^{[n]}$     be the input image to be denoised at iteration n
$\hat{I}^{[n]}$     be the denoised estimated image at iteration n
ϵ     be the threshold
    For all (8 horizontal and 8 vertical) shifts of $I^{[n]}$ do
       For all 8 × 8 blocks extracted from $I^{[n]}$ do
          1.   DCT transform
          2.   Threshold the obtained DCT coefficients $w$ with the hard thresholding rule
             $w$ hard$_\epsilon$ = 0 if $|w| \le \epsilon$, $w$ otherwise
          3.   Inverse DCT of these threshold coefficients
    Unshift the filtered image and store it
$\hat{I}^{[n]} \leftarrow$ Averaging of these 64 denoised images EM-Based Estimation Step In order to refine the estimation given by the above-mentioned denoising step, the estimation method now relies on an additional constraint, namely that the PSF to be estimated has the following parametric form:

$$h(x, y) = \exp\left[-\left(\frac{x^2}{2\sigma_x^2} + \frac{y^2}{2\sigma_y^2}\right)\right]\cos(2\pi f_o y) \quad \text{Equation 5}$$

which is the PSF model used in [15], i.e. asymmetric (across the x-axis and y-axis) cosine modulated by a Gaussian envelope whose the Fourier spectrum, i.e. its MTF (in fact a band-pass filter), namely H(u,v) can be written in the Fourier domain:

$$H(u,v) = \pi\sigma_x\sigma_y \exp(-2\pi^2\sigma_x^2 u^2)\{\exp(-2\pi^2\sigma_y^2(v-f_o)^2) + \exp(-2\pi^2\sigma_y^2(v+f_o)^2)\} \quad \text{Equation 6}$$

Under this constraint, the regression model that gives, for the set of amplitude values of |H(u,v)|, the best fit, in the least square sense, of two equally weighted Gaussian distributions (with the constraints that these two distributions are centered at u=0 and symmetric with respect to v) can now be considered. In that respect, this latter regression model can be efficiently addressed by considering the parameter statistical estimation problem of a (noisy) Gaussian distribution mixture of two (equally weighted) Gaussian component in R² by considering Nf 2-dimensional vectors v=(u,v)$^t$, v={vi, 1≤i≤Nf}, taking their values in R² and whose cardinality of each v is given by the amplitude value H(u,v). Finally, it is assumed that v=v1, ..., vN$_F$ is a realization in, IR², of V whose density takes the form of the following 2-component mixture:

$$P_V(v) = \sum_{k=1}^{2} p_k P_{V/C}(v/c_k, \Psi_k) \quad \text{Equation 7}$$

in which, the 2 components PV/Ci(v/ck,ψk) are, in the present application (see Equation 5) assumed to be two equally weighted (p1=p2=0.5) bi-variate Gaussian distributions with mean vector μk and identical covariance matrix Σ(ψk=(μk,Σ)), i.e.:

$$P_{V/C_i}(\cdot) = \frac{1}{2\pi}|\Sigma|^{\frac{1}{2}}\exp\left\{-\frac{1}{2}(v-\mu_k)^t\Sigma^{-1}(v-\mu_k)\right\} \quad \text{Equation 8}$$

In this setting, the identification of the parameters of the PSF spectrum modulus H(uv) amounts to estimate the parameters (ψ1 and ψ2 with the constraints that these two distributions are centered at u=0 (μ1=(u=0, v1)$^t$ and μ2=(u=0, v2)) and v1 and v2 symmetric with respect to v=0, i.e. of opposite signs. This 2-component Gaussian mixture model is estimated thanks to a EM-based clustering algorithm [11]. The initial parameters of this iterative procedure are given by the ML estimation on the partition given by a simple K-means clustering procedure. The constraint of identical covariance matrix and mean vector centered at u=0 are taken into account at the end of the procedure by simply considering the average value of the two covariance matrices and the average absolute value of v1 and v2.

Deconvolution

In order to improve the spatial resolution of the ultrasound images and to obtain an estimate of the true tissue reflectivity function, the ultrasound system's point-spread function can now be deconvolved out. In the present application, an unsupervised Bayesian deconvolution approach [16] is being used (or a penalized likelihood framework) exploiting a non-parametric adaptive prior distribution derived from the recent image model proposed by Buades [17]. This prior distribution expresses that acceptable deconvolved solutions are the images exhibiting a high degree of redundancy. In this setting, the deconvolution of ultrasound images leads to the following cost function to be optimized:

$$E(f)=\|g-h*f\|+\rho\|f-Y_{[g]}(f)\|$$ Equation 9 where the first term expresses the fidelity to the available data g and the second encodes the expected property of the true undegraded image and Y[g](f) designates the non-local means filter in [17] applied on f. ρ, the regularization parameter controlling the contribution of the two terms (which is crucial in the determination of the overall quality of the final estimate), is estimated with the method proposed in [16].

EXAMPLE

Figure 4A:
FIGS. 4A and 4B are ultrasound images of a distal femur showing the medial side, coronal plane (FIG. 4A) and the medial posterior condyle, axial plane (FIG. 4B)
Figure 4B:
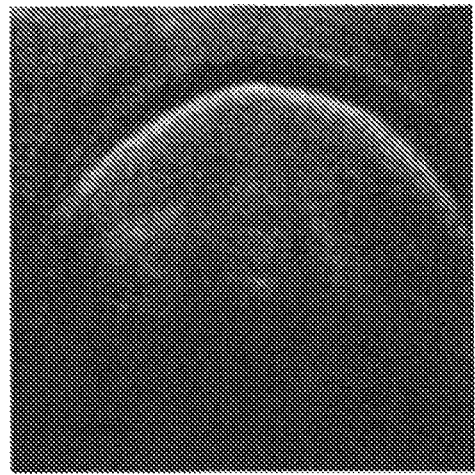

The PSF estimation approach and deconvolution were texted on ultrasound images of several bones acquired using a portable B-mode ultrasound imaging system (Titan™, SonoSite Inc., Bothell, Wash., USA). The echographic appearance of the various tissues ranges from dark (low-echoic) to bright (high-echoic), depending on their acoustic impedance. FIGS. 4A and 4B show the original ultrasound images of the distal femur, more specifically the medial side, coronal plane (FIG. 4A) and the medial posterior condyle, axial plane (FIG. 4B)

Figure 5A:
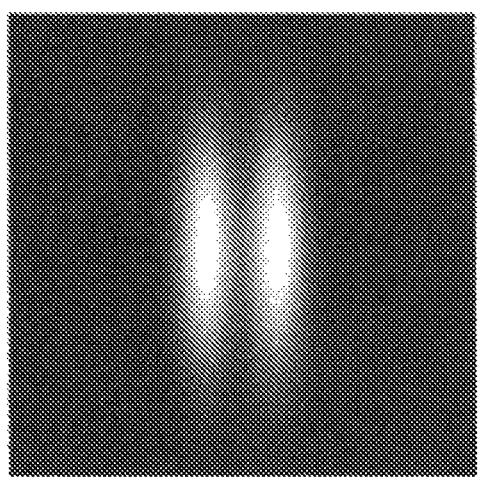
FIGS. 5A and 5B show the modulus of H˜(u,v) after application of the discrete cosine transform (DCT)-based denoising step to the images of FIG. 4A and FIG. 4B, respectively.
Figure 5B:
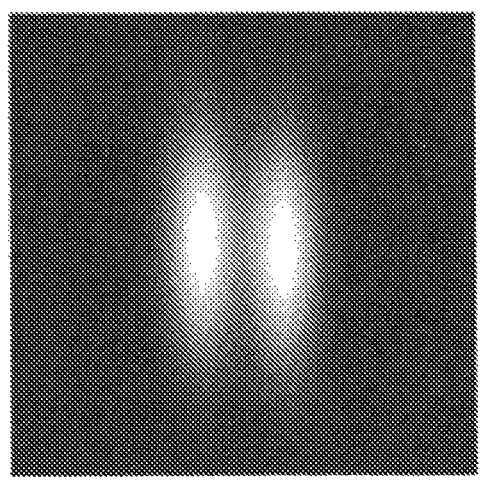
Figure 6A:
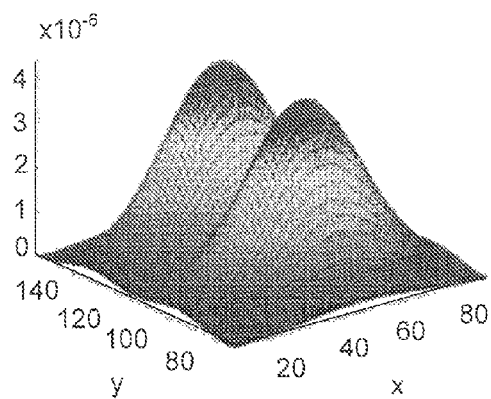
FIGS. 6A and 6B are surface plots of the point-spread function (PSF) defining a two-component mixture of bivariate Gaussian distributions for FIG. 5A with α=[54.18 134.21; 51.82 94.88] and σ=([358.66 4.18; 4.18 151.00], [358.84 4.10; 4.10 149.45]), and FIG. 5A with μ=[53.05 131.53; 52.94 97.40] and σ=([368.94−5.48; −5.48 97.40], [368.95−5.47; −5.47 96.45])
Figure 6B:
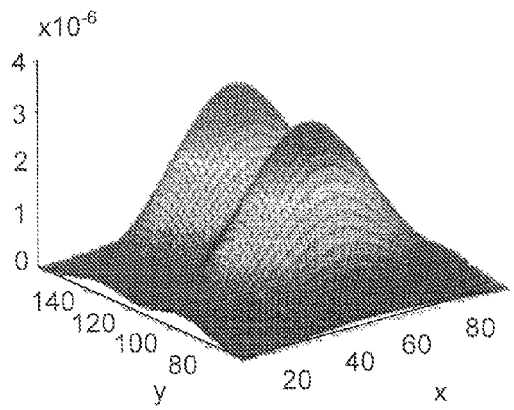
Figure 7A:
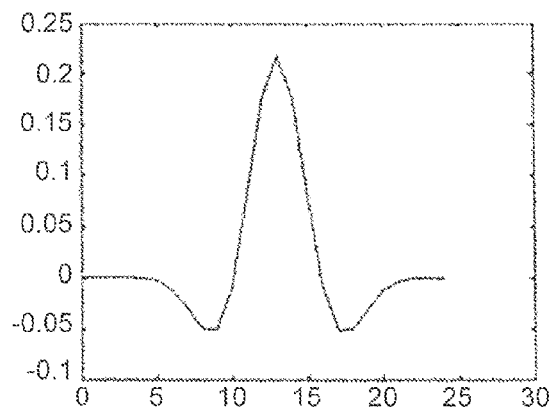
FIGS. 7A to 7D are estimated spectrums of the point-spread function (PSF) corresponding to FIG. 4A (FIGS. 7A and 7C) and FIG. 4B (FIGS. 7B and 7D)
Figure 7B:
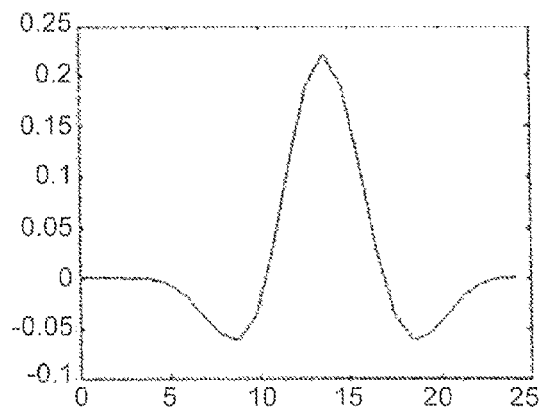
Figure 7C:
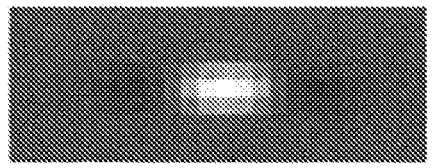
Figure 7D:
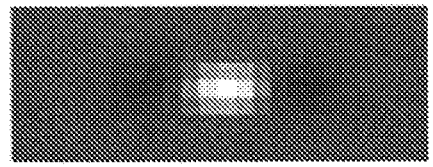

FIGS. 5A and 5B show the modulus of Hˆ(u,v) after application of the DCT-based denoising step to the images of FIG. 4A and FIG. 4B, respectively. It can be seen that two different pass-band filters, related to two different PSFs are visible on these images. It can also be seen that there is no aliasing error and this first denoising step allowing the obtainment of the expected shape of a band-pass filter (see Equation 5) on which the learning step of the Gaussian mixture, exploiting the EM procedure, will be achieved. The Gaussian mixture, estimated from these two spectrum data by the EM algorithm (without the additional constraint of symmetry) is shown in FIGS. 6A and 6B. Two examples of PSF estimation with the present approach are presented in FIGS. 7A to 7D. Finally, FIGS. 8A and 8B show examples of deconvolution ultrasound images using the deconvolution scheme presented herein.

Figure 8A:
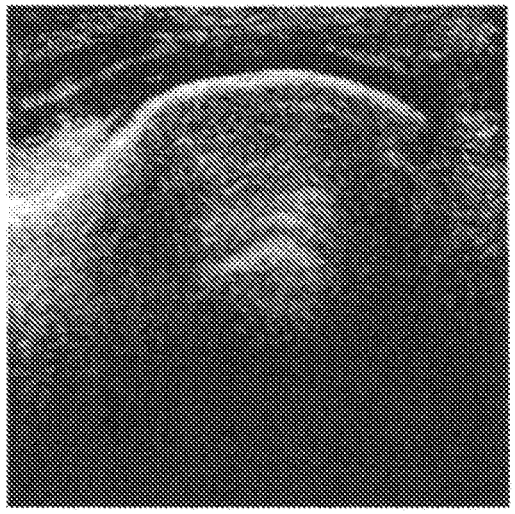
FIGS. 8A and 8B are deconvolved images corresponding to FIG. 4A and FIG. 4B, respectively.
Figure 8B:

More specifically, FIGS. 6A and 6B are surface plots of the point-spread function (PSF) defining a two-component mixture of bivariate Gaussian distributions for FIG. 5A with μ=[54.18 134.21; 51.82 94.88] and σ=([358.66 4.18; 4.18 151.00], [358.84 4.10; 4.10 149.45]), and FIG. 5A with μ=[53.05 131.53; 52.94 97.40] and σ=([368.94−5.48; −5.48 97.40], [368.95−5.47; −5.47 96.45]);

FIGS. 7A to 7D are estimated spectrums of the point-spread function (PSF) corresponding to FIG. 4A (FIGS. 7A and 7C) and FIG. 4B (FIGS. 7B and 7D), and FIGS. 8A and 8B are deconvolved images corresponding to FIG. 4A and FIG. 4B, respectively.

Using the above-describe image restoration system and method, greater resolution improvement of the deconvolved ultrasound images can be observed with substantially improved definition of the outer contour of biological structures and can easily be used for commercial ultrasound applications due to its spatial resolution improvement or as a prerequisite stage for the segmentation and 3D reconstruction of ultrasound images.

It should be noted that although reference has been made to ultrasound images and ultrasound imaging systems throughout the present disclosure, it is to be understood that the image restoration system and method may be applied and/or adapted to other types of images and imaging systems such as, for example, radioscopic, radiographic and echographic images from radioscopic, radiographic and echographic imaging systems, or any other such images and imaging systems.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the disclosure as hereinafter claimed.

REFERENCES

In the present disclosure, references are made to the following reference documents which are herein incorporated by reference.

[1] Mignotte, M., Meunier, J., Soucy, J.-P., and Janicki., C., "Comparison of deconvolution techniques using a distribution mixture parameter estimation: application in spect imagery," Journal of Electronic Imaging 1, 11-25 (January 2002).

[2] Ayers, G. and Dainty, J., "Iterative blind deconvolution method and its application," Optics Letters 13, 547-549 (July 1988).

[3] Katsaggelos, A. and Lay, K., "Maximum likelihood blur identification and image restoration using the expectation-maximization algorithm," IEEE Trans. on Signal Processing 39, 729-733 (March 1991).

[4] Kundur, D. and Hatzinakos, D., "Blind image restoration via recursive filtering using deterministic constraints," in [Proc. International Conference on Acoustics, Speech, and Signal Processing], 4, 547-549 (1996).

[5] Benameur, S., Mignotte, M., Soucy, J.-P., and Meunier, J., "Image restoration using functional and anatomical information fusion with application to spect-mri images," International Journal of Biomedical Imaging 2009, 12 pages (October 2009).

[6] Cannon, M., "Blind deconvolution of spatially invariant image blurs with phase," IEEE Transactions on Acoustics, Speech and Signal Processing 24, 58-63 (February 1976).

[7] Abeyratne, U., Petropulu, A., and Reid, J., "Higher order spectra based deconvolution of ultrasound images," IEEE Transactions on Ultrasonics, Ferroelectrics and Frequency Control 42, 1064-1075 (November 1995),

[8] Taxt, T., "Restoration of medical ultrasound images using two-dimensional homomorphic deconvolution," IEEE Transactions on Ultrasonics, Ferroelectrics and Frequency Control 42, 543 554 (July 1995),

[9] Michailovich, O. and Adam, D., "A novel approach to the 2-d blind deconvolution problem in medical ultrasound," IEEE Trans. on Medical Imaging 24, 86-104 (January 2005).

[10] Adam, D. and Michailovich, O., "Blind deconvolution of ultrasound sequences using nonparametric local polynomial estimates of the pulse," IEEE Transactions on Biomedical Engineering 49, 118-131 (February 2002).

[11] Dempster, A., Laird, N., and Rubin, D., "Maximum likelihood from incomplete data via the EM algorithm," Royal Statistical Society 1-38 (1976).

[12] Mignotte, M., "Fusion of regularization terms for image restoration," Journal of Electronic Imaging 19, 333004— (July-September 2010).

[13] Donoho, D. L. and Johnstone, I. M., "Ideal spatial adaptation by wavelet shrinkage," Biometrika 81, 425-455 (1994).

[14] Coifman, R. and Donohu, D., "Translation in variant denoising," in [Wavelets and Statistics, Lecture Notes in Statistics], 103, 125-150, A. Antoniadis and G. Oppenheim, Eds. New York: Springer-Verlag (1995).

[15] KaDel, F., Bertrand, M., and Meunier, J., "Speckle motion artifact under tissue rotation," IEEE Transactions on Ultrasonics, Ferroelectrics and Frequency Control 41, 105-122 (January 1994).

[16] Mignotte, M., "A non-local regularization strategy for image deconvolution," Journal Pattern Recognition Letters 29(16), 2206-2212 (2008).

[17] Buades, A., Coll, B., and Morel, J. M., "A review of image denoising algorithms, with a new one," Multiscale Modeling and Simulation (SIAM Interdisciplinary Journal) 4(2), 490-530 (2005).

What is claimed is:

1. A system for improving the quality of an imaging system image, comprising:
   an input/output interface configured to receive the imaging system image;
   a processor in communication with the input/output interface, the processor being configured to:
   a) subdivide the imaging system image;
   b) apply discrete cosine transform (DCT) denoising using a hard thresholding rule;
   c) apply an iterative expectation-maximisation (EM) regression model;
   d) estimate the point spread function;
   e) set the DCT deconvolution factor to the estimated point spread function;
   f) apply the DCT deconvolution factor to the subdivided image; and
   g) provide a restored image based on the deconvoluted subdivided image.

2. The system for improving the quality of an imaging system image of claim 1, further comprising:
   a display in communication with the input/output interface, the input/output interface being further configured to provide the restored image to the display.

3. The system for improving the quality of an imaging system image of claim 1, further comprising:
   an imaging system in communication with the input/output interface, the imaging system providing the imaging system image to the input/output interface.

4. The system for improving the quality of an imaging system image of claim 3, wherein the imaging system is an ultrasound imaging system.

5. The system for improving the quality of an imaging system image of claim 3, wherein the imaging system is selected from a group consisting of a radioscopic imaging system, a radiographic imaging system and an echographic imaging system.

6. The system for improving the quality of an imaging system image of claim 1, wherein the imaging system image is an ultrasound image.

7. The system for improving the quality of an imaging system image of claim 1, wherein the imaging system image is selected from a group consisting of a radioscopic image, a radiographic image and an echographic image.

8. The system for improving the quality of an imaging system image of claim 1, further comprising the step of applying a homomorphic filter to the associated modulation transfer function of the point spread function of the imaging system image prior to step b).

9. The system for improving the quality of an imaging system image of claim 1, wherein step b) consist in applying, iteratively, frequential filtering based on the DCT of 8×8 sub-images resulting from the subdividing of the imaging system image at step a).

10. The system for improving the quality of an imaging system image of claim 1, wherein in step c) the EM regression model is set using the following parametric form of the modulation transfer function in the Fourier domain:

$$H(u,v) = \pi \sigma_x \sigma_y \exp(-2\pi^2 \sigma_x^2 u^2) \{\exp(-2\pi^2 \sigma_y^2 (v-f_o)^2) + \exp(-2\pi^2 \sigma_y^2 (v+f_o)^2)\} \text{ and}$$

applying an expectation-maximisation-based clustering algorithm to the regression model.

11. The system for improving the quality of an imaging system image of claim 1, wherein step f) is performed using an unsupervised Bayesian deconvolution approach.

12. A method for improving the quality of an imaging system image, comprising the steps of:
   a) subdividing the imaging system image;
   b) applying discrete cosine transform (DCT) denoising using a hard thresholding rule;
   c) applying an iterative expectation-maximisation (EM) regression model;
   d) estimating the point spread function;
   e) setting the DCT deconvolution factor to the estimated point spread function;
   f) applying the DCT deconvolution factor to the subdivided image; and
   g) providing a restored image based on the deconvoluted subdivided image.

13. The method for improving the quality of an imaging system image of claim 12, wherein the imaging system image is an ultrasound image.

14. The method for improving the quality of an imaging system image of claim 12, wherein the imaging system image is selected from a group consisting of a radioscopic image, a radiographic image and an echographic image.

15. The method for improving the quality of an imaging system image of claim 12, further comprising the step of applying a homomorphic filter to the associated modulation transfer function of the point spread function of the imaging system image prior to step b).

16. The method for improving the quality of an imaging system image of claim 12, wherein step b) consist in applying, iteratively, frequential filtering based on the DCT of 8×8 sub-images resulting from the subdividing of the imaging system image at step a).

17. The method for improving the quality of an imaging system image of claim 12, wherein in step c) the EM regression model is set using the following parametric form of the modulation transfer function in the Fourier domain:

$$H(u,v) = \pi \sigma_x \sigma_y \exp(-2\pi^2 \sigma_x^2 u^2) \{\exp(-2\pi^2 \sigma_y^2 (v-f_o)^2) + \exp(-2\pi^2 \sigma_y^2 (v+f_o)^2)\} \text{ and}$$

applying an expectation-maximisation-based clustering algorithm to the regression model.

18. The method for improving the quality of an imaging system image of claim 12, wherein step f) is performed using an unsupervised Bayesian deconvolution approach.

* * * * *